MULTIPLE MAGNETIC HEAD CONSTRUCTION

Filed April 21, 1953

INVENTOR.
Michael Rettinger
BY Orl R. Goshan
ATTORNEY.

2,756,280
Patented July 24, 1956

2,756,280

MULTIPLE MAGNETIC HEAD CONSTRUCTION

Michael Rettinger, Encino, Calif., assignor to Radio Corporation of America, a corporation of Delaware Application April 21, 1953, Serial No. 350,188
9 Claims. (Cl. 179—100.2)

This invention relates to multiple magnetic head structures, and particularly to a construction of such heads to provide an efficient and pre-aligned final integral assembly.

Multiple magnetic track recording systems are well-known. The majority of these systems use coaxial ring-type magnetic heads arranged transversely across the magnetic record medium. When a plurality of such heads, as shown in my U. S. Patent No. 2,628,286 of February 10, 1953, are individually constructed, the mounts for such heads require adjusting mechanisms for each head to insure that the gaps between the pole tips of the cores are in alignment, that the proper film bearing is obtained, and that each gap has the proper orientation with respect to the direction of movement of the magnetic medium being recorded or reproduced. The problems encountered and the complexity of such mounts are disclosed in Pettus co-pending U. S. application, Ser. No. 230,403, filed June 7, 1951, now Patent No. 2,644,-856 of July 7, 1953.

The present invention is directed to a method of constructing a multiple track recording or reproducing head, which, when finally assembled, will have all the faces of the pole tips in two respective parallel planes. Also, the bearing and contact relationship between the magnetic medium and the pole tips will be the same for all heads. Thus, only a simple adjustment or two are required to correct for any azimuth variation for all heads or possible contact differences on opposing pole pieces. The method of construction described hereinafter permits the multiple head assembly to be economically constructed while providing the heads with the maximum of sensitivity, the desired frequency characteristics, and the minimum of cross-talk between the heads. The final head assembly is very small for any particular number of heads.

The principal object of the invention, therefore, is to facilitate the construction of multiple magnetic head units.

Another object of the invention is to provide an improved construction of a multiple magnetic head unit.

A further object of the invention is to provide an improved multiple magnetic head unit.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Figures 1, 2, 3, 4, 5:
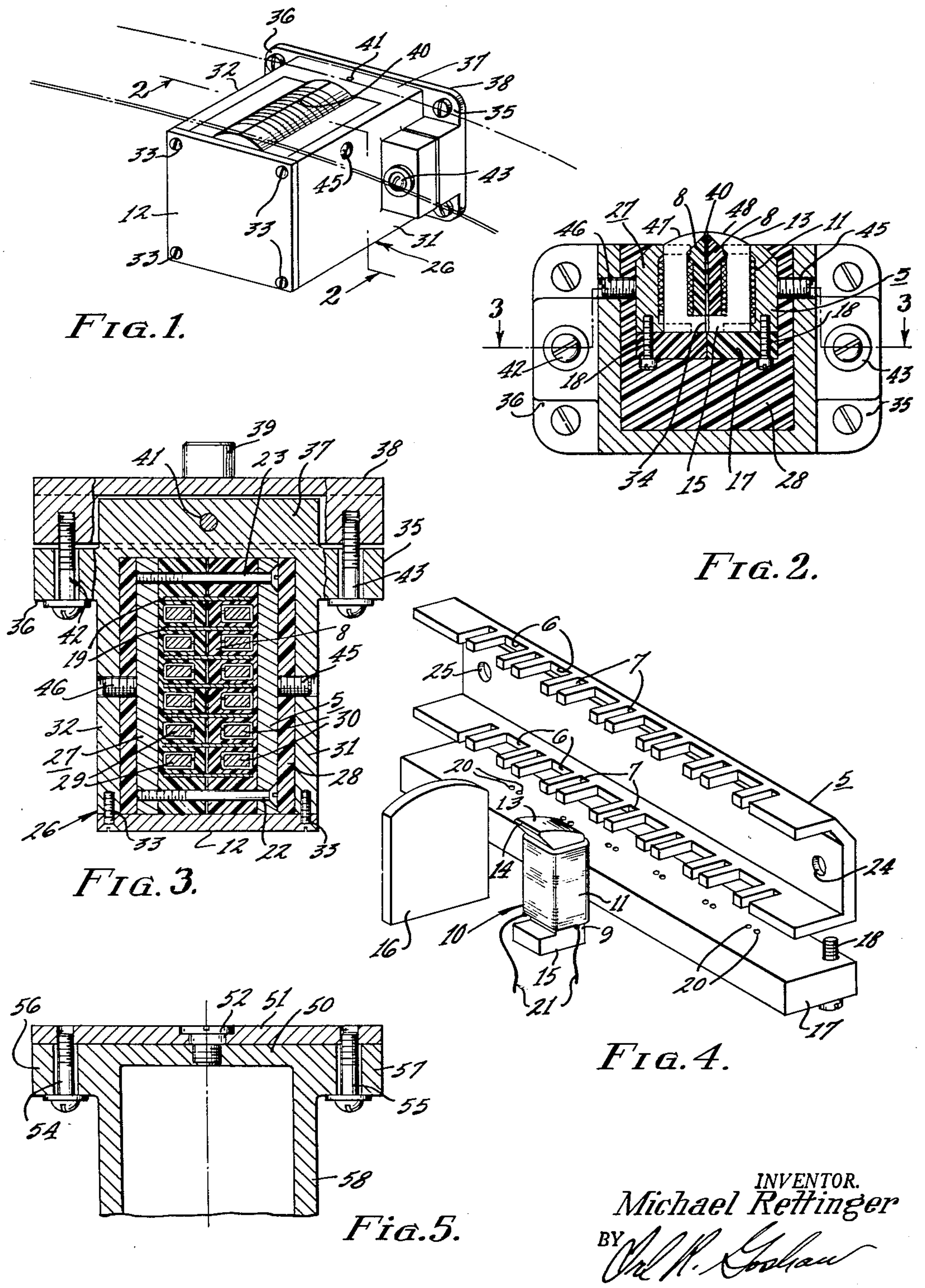
Fig. 1 is a perspective view showing a multiple magnetic head assembly embodying the invention.
Fig. 2 is a cross-sectional view of the invention taken along the line 2—2 of Fig. 1.
Fig. 3 is a cross-sectional view of the invention taken along the line 3—3 of Fig. 2.
Fig. 4 is an exploded view of the elements forming a cluster of half head sections.
Fig. 5 is a detail view of a mounting to obtain a rotational adjustment.

Referring now to the drawings, in which the same numerals identify like elements, and particularly referring to Fig. 4, a brass frame or rail 5 is used to mount and assemble half sections of the heads into a cluster. The frame 5 is U-shaped, and has a plurality of wide notches 6 alternately disposed with a plurality of narrow notches 7, these notches being in both legs of the frame. In the aligned wide notches 6 in both legs of frame 5, are positioned respective ends of the cores of the half head sections, one half head section being shown at 10 with its U-shaped core 9. This half head section 10 also has a coil 11 of a certain predetermined number of turns of wire on the central portion thereof. The pole tip section 13 of the half head section 10 is tapered to form a pole face 14, while the lower end 15 is rectangular in shape. In the particular frame 5, provision is made for six half sections 10 and seven partitions 16. The frame could be slotted for forming other numbers of heads. A terminal board or plate 17 is fastened to the rack of frame 5 by screws such as shown at 18. The board has holes 20 therein through which the leads 21 of the coil 11 are passed and connected to terminals (not shown) on the opposite side of the board. The head half sections are carefully adjusted in the notches or slots 6 so the head height, bearing, rotation, and track placement are the same for each section.

After six, or whichever number of half head sections are to be assembled, are correctly positioned in the frame 5 along with partitions 16 in slots 7 and the terminal plate 17 is fastened thereto, this cluster is placed in a form which is filled with a casting resin and placed in an oven for curing. This plastic is illustrated at 8 in Fig. 2. Before the partitions 16, which are approximately .020 of an inch thick, are placed in their respective notches 7, they are greased. Now, before the resin has completely cooled, the greased partitions can be easily removed, leaving grooves in the resin in which slightly thinner mumetal shields, such as shown at 19 in Fig. 3, are placed. With the partitions 16 removed, the pole faces 14 of all of the half sections 10 in the cluster can be simultaneously lapped on a flat plate, thus assuring that the pole faces will all be in the same plane.

The next step in constructing the final assembly is to take two clusters, such as just described, and fasten them together by screws, such as shown at 22 and 23, passing through holes 24 and 25, respectively, in the rack 5 and threaded in holes in the opposing rack, such as shown at 27 in Fig. 3. A non-magnetic spacer of .0002 of an inch thick, as shown at 40, is placed between opposing pole faces. There is also a back-gap spacer 34, .004 of an inch thick. (See Fig. 2.) The clusters are then placed in a five-sided receptacle or casing 26, one end being a plate 12 attached to the side walls 31 and 32 by screws 33. The other end of the casing, as shown in Figs. 1 and 3, has bosses or ears 35 and 36 on the sides 31 and 32, respectively, and edge extensions or flanges 37 which form a groove therebetween. A mounting plate 38 has a portion within the groove and a mounting stud 39. A pin 41 passes through the flanges and plate 38 so that the casing may pivot on the pin 41 by loosening one or the other of screws 42 and 43 and tightening the opposite screw. This adjustment will adjust the heads for azimuth.

As mentioned above, the casing or receptacle 26 has five sides, one side being open. The assembly of the two half head section clusters held together by screws 22 and 23 is now positioned in casing 26. To properly position the clusters within the receptacle, set screws 45 and 46 are threaded through the sides 31 and 32 and abut against the frames 5 and 27. The assembly of both clusters is now plasticized in the metal receptacle 26 in the same manner as the individual clusters were previously plasticized. This plastic is shown at 28. Thus, there is provided a structure which has, in the present instance, a plurality of six heads illustrated by cores 29 and 30 in Fig. 3 with seven mumetal shields 19. The bearing surfaces 47 and 48 of the pole tips of the head shown in Fig. 2 are properly aligned with the bearing surfaces of the pole tips of the other heads, the pole faces, forming the recording and reproducing gaps, being in two parallel planes.

Referring now to Fig. 5, a casing 58 has bosses 56 and 57 adjacent one end wall 50 thereof. In this instance, the end 50 abuts a mounting plate 51 through which a bearing screw 52 passes and which is threaded into the end wall 50. Screws 54 and 55 pass through oversized holes in the bosses 56 and 57, respectively, so that the casing 58 may be slightly rotated on the axis of the screw 52. It is also to be understood that the plate 51 may be positioned adjacent the plate 38 to provide a rotational adjustment in combination with the azimuth pivoting structure, if desired or necessary. Since location pins are usually used to position the casing 26 or the casing 58 in a recorder or reproducer, very little, if any, further adjustments are required.

It has been found that, by constructing any number of ring-type magnetic heads by forming clusters of half head sections, the final assemblies may be produced quickly and economically, while providing particularly sensitive and efficient heads for multiple magnetic track recording.

I claim:

1. A multiple magnetic head structure comprising a pair of U-shaped frames having a series of different sized notches in each leg thereof alternately positioned and opposing one another, a plurality of half magnetic head sections positioned in the larger sized notches of each of said frames, a plurality of shields positioned in the smaller notches of said frames, a five sided rectangular casing having portions of said half head sections extending beyond the surface of the open side of said casing, and plastic embedding said frames and said half head sections in said casing.

2. A multiple magnetic head construction in accordance with claim 1, in which said half head sections have U-shaped cores with a winding on the central portions thereof and pole tips at one end thereof, the pole tips of two opposing half head sections having gaps therebetween and forming individual magnetic heads.

3. A multiple magnetic head construction in accordance with claim 1, in which said casing has bosses extending from opposite sides adjacent one end thereof, said end having extending flanges, a bracket extending between said flanges, and a pin passing through said flanges and said bracket, said casing being pivotable on said pin.

4. A multiple ring type magnetic head unit comprising a pair of U-shaped frames having the ends of the legs thereof opposing each other, each leg having a series of notches therein, alternate notches being of the same width and of a different width from the other alternate notches, each head half section including a U-shaped core having a tapered pole tip and a winding around the central portion thereof, said sections being mounted in alternate notches in the legs of said frames, a plurality of shields in said other notches between said head sections, a plastic for forming one of said frames, a certain number of said head sections therein and a certain number of said shields therein into a cluster, the faces of the pole tips of said sections lying in a plane, means for holding a pair of clusters in position with the faces of the pole tips of each cluster opposing one another, and a plastic for forming a pair of said clusters into a single unit having the number of independent ring type heads determined by the number of sections in each cluster.

5. A multiple ring type magnetic head structure in accordance with claim 4, in which a five sided rectangular casing is provided for said clusters, the pole tips of said sections extending beyond the surface of the open side of said casing.

6. A multiple ring type magnetic head structure in accordance with claim 5, in which a mounting plate is pivoted to one end of said casing, means being provided for holding said casing to said plate in any adjusted position.

7. A multiple ring type magnetic head structure in accordance with claim 5, in which a mounting plate is provided parallel with and adjacent one end of said casing, said casing having a groove therein accommodating a boss on said plate, and a pin through said boss and sides of said groove on which said casing is pivotable with respect to said plate.

8. A multiple magnetic head structure comprising a pair of U-shaped frames having the edges of the legs thereof facing one another, a plurality of half magnetic head sections positioned on each frame, each head half section including a U-shaped core having a tapered pole tip and a winding around the central portion thereof, the faces of the pole tips of each plurality of half magnetic head sections on each frame lying in spaced parallel planes, means for holding said frames and head sections in assembly, the faces of the half magnetic head sections on one frame being adjacent and opposing the faces of the half magnetic head sections on the other frame of said pair of frames, a parallel positioned shield between each pair of said half head sections opposing one another, and a plastic for holding said half head sections and said shields in position with respect to one another.

9. A multiple magnetic head structure in accordance with claim 8 in which is provided an open-sided casing for said frames, said half magnetic head sections and said shields, certain portions of said half magnetic head sections extending beyond the surface of the open side of said casing, and a plastic embedding said frames, half magnetic head sections and said shield within said casing.

References Cited in the file of this patent

UNITED STATES PATENTS

| | | |
|---|---|---|
| 2,020,211 | Quam | Nov. 5, 1935 |
| 2,020,212 | Quam | Nov. 5, 1935 |
| 2,456,767 | Camras | Dec. 21, 1948 |
| 2,612,681 | Camras | Oct. 7, 1952 |
| 2,676,392 | Buhrendorf | Apr. 27, 1954 |
| 2,677,019 | Buhrendorf | Apr. 27, 1954 |